June 16, 1925.
T. J. MURPHY
SPEED GOVERNOR
Filed April 3, 1924
1,542,080
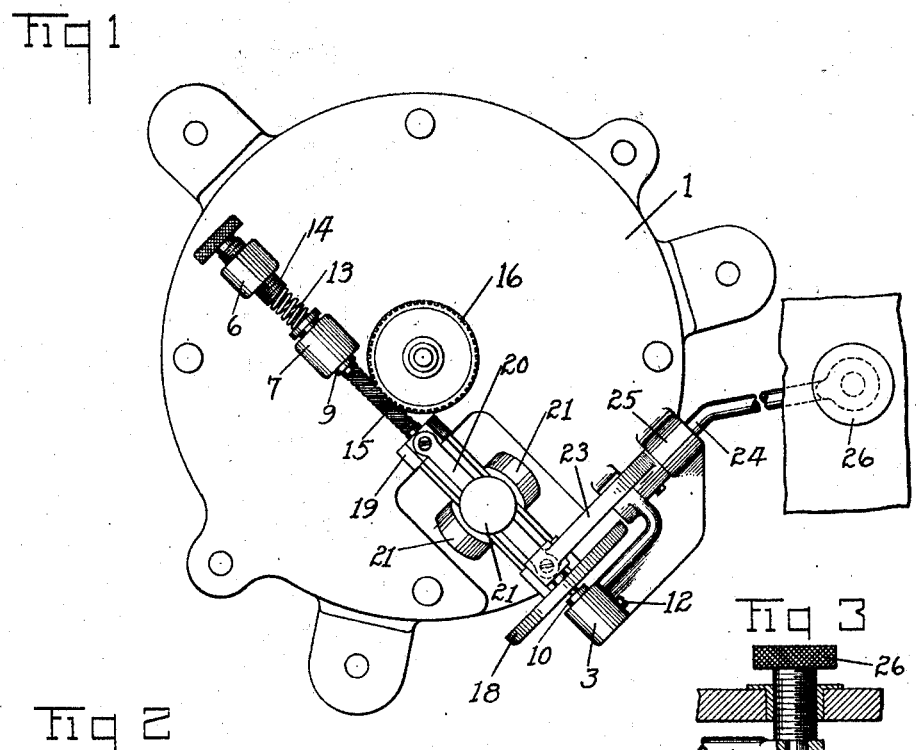
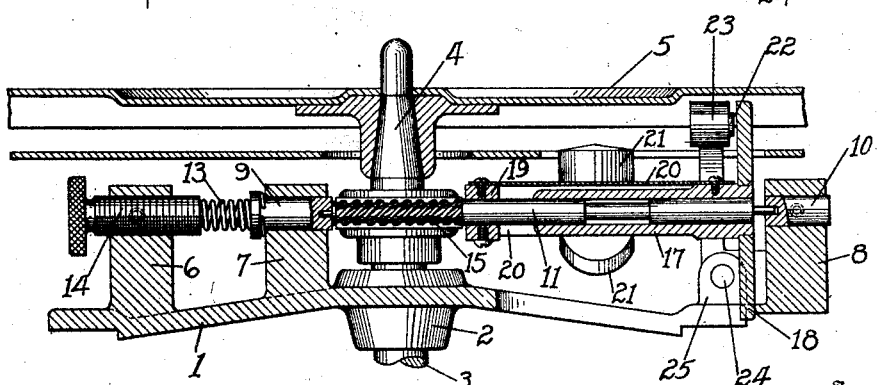

Patented June 16, 1925.

1,542,080

UNITED STATES PATENT OFFICE.

THOMAS J. MURPHY, OF ASTORIA, NEW YORK, ASSIGNOR OF ONE-HALF TO JAMES P. B. DUFFY, OF ROCHESTER, NEW YORK.

SPEED GOVERNOR.

Application filed April 3, 1924. Serial No. 704,006.

*To all whom it may concern:*

Be it known that I, THOMAS J. MURPHY, a subject of the King of Great Britain, and a resident of Astoria, in the county of Queens and State of New York, have made an Invention Appertaining to a Speed Governor, which invention is fully set forth in the following specification.

My invention has for its object to provide an efficient phonograph speed governor for producing a uniform rotation of the record table at adjusted speeds. The invention is applicable to phonographs driven by electric motors or by spring motors, but it is particularly advantageous when used in connection with electrical driven phonographs for producing a uniform rate of speed of the armature of the motor and also of the record table notwithstanding any fluctuation of the applied voltage.

The invention may be contained in different forms of structures. To illustrate a practical application of the invention I have selected one of such structures and shall describe it hereinafter. The structure selected for the purpose of illustration is shown in the accompanying drawing.

Fig. 1 of the drawings illustrates a top view of the governor. Fig. 2 illustrates a sectional view. Fig. 3 illustrates an adjustable member for adjusting a brake member.

A supporting plate 1 is suitably secured in the cabinet of the phonograph and, if desired, may be provided with a bearing 2 through which the motor shaft 3 extends. The outer end of the shaft 3 is provided with the usual cone shaped portion 4 for producing a frictional engagement with the record table 5. The plate 1 is provided with lugs or bosses 6 and 7 and the bracket 8. In the lug 7 and the bracket 8 are located bearings 9 and 10 in which opposite ends of the shaft or spindle 11 are supported. The bearing 10 is secured in the bracket 8 by a screw 12 while the bearing 9 is movable longitudinally in the lug 7 and consequently the spindle 11 is permitted to have a longitudinal movement with the bearing 9. Such movement, however, being sufficiently limited to prevent the spindle 11 from leaving the bearing 10. This movement, however, is elastically resisted by means of a spring 13 located between the bearing 9 and the screw member 14 that is threaded in the lug 6. The compression of the spring and, consequently, the resistance of the end thrust and movement of the spindle 11, may be adjusted by means of the member 14.

The spindle 11 has at one end a worm 15 that meshes with a worm wheel 16 which is connected to the motor shaft 3. The angle of the meshing gear teeth between the worm and the worm wheel is such as to afford an efficient driving connection for rotating the spindle 11 and so as to produce a longitudinal thrust against the movable bearing 9. The movement of the bearing is resisted by the spring 13.

The endwise movement of the spindle 11 against the yielding resistance of the spring 13 is utilized for applying a brake to the movement of the record table 5. The effectiveness of the speed regulation is improved by subjecting the spindle to a resistance to its rotation during the operation of the machine, to produce at all times the condition of some end thrust in the spindle to prevent the sudden acceleration of the armature and to make the spindle, in its endwise movement, accurately responsive to the speed of rotation induced by the worm gear. Also it is desirable to release the brake completely during the starting operation of the motor in order that the motor may not draw too large a starting current. In order to accomplish these functions the spindle 11 is provided with a sleeve that slides longitudinally on the spindle. The sleeve is provided at one end, with a brake disc 18 and the spindle 11 is provided with a collar 19. The disc 18 is secured to the sleeve 17 and the collar is secured to the spindle. A plurality of resilient metal strips 20 are secured at one end, in each case, to the collar 19 and at the other end to the more remote end of the sleeve 17. Suitable weights 21 are secured to the resilient strips 20. When, therefore, the spindle is rotated the weights 21 are rotated which produces a centrifugal force that causes the sleeve 17 to move along the spindle 11 by reason of the distension of the springs 20. This provides for a certain amount of resistance to the rotation of the spindle 11 to produce a sensitive floating or balanced relation at the normal operating adjusted speeds as determined by the adjustment of the screw member 14. A brake member 22 is supported in the end of an arm 23 that is carried by a rod 24 that rotates in a bearing 25 that is supported on the plate 1. The rod 24 extends angularly to one side of the record table where it is engaged by the end of an adjusting screw 26 that is accessibly located for purposes of adjustment. The end of the rod 24 may be pressed at all times against the adjusting screw 26 by a flat spring screwed to the bottom of the motor board, not shown in the drawing. The bearing 25, that pivotally supports the arm 23, is located below the brake member 22 so that when the outer end of the rod 24 is depressed the brake member 22 is moved towards the disc 18. The screw member 26 serves to adjustably locate the rod 24, and, consequently, the brake member 22, to determine the permissible endwise movement of the sleeve 17 before the disc 18 makes contact with the brake member 22. Longitudinal movement of the spindle, beyond a pre-determined point as determined by the adjustment of the screw member 26 moves the disc 18 against the brake member 22 to produce a brake action on the disc 18 and consequently on the motor and the record table.

In the operation, the disc 18 is away from the brake member 22 so that the motor may be started without any braking action and without any appreciable resistance to its rotation. When the motor is in operation the centrifugal action of the weights 21 moves the sleeve 17 along the spindle to produce at all times a braking action of the machine, since there is a certain amount of end thrust of the spindle against the bearing 9 and possibly a very slight action as between the brake member 22 and the disc 18. When, however, the motor tends to speed up for any reason, such as in case of an electric motor, when there is an increase in voltage, the disc is pressed against the brake member 22 which produces a decided effective brake action, since the brake member operates along the peripheral portion of the disc. The action of the governor as a whole, therefore, is sensitive and regulates with precision the speed of the motor according to the adjustment of the screw members 14 and 26.

I claim:

1. In a speed governor, the combination of a part to be governed, a rotary element, gear means connecting said part and element to rotate the latter, means supporting said element for rotation and also for axial movement produced by variation in the force transmitted by said gear means, adjustable resilient means resisting said axial movement of said element, centrifugal speed means including a part carried by said element and actuated by said centrifugal means and also by said axial movement of said element for maintaining the speed of the latter constant.

2. In a speed governor, the combination of a rotary part to be governed, a governor spindle, gear means connecting said part and spindle for rotating the latter, means supporting said spindle for rotation and also for axial movement produced by variation in the force transmitted by said gear means, and braking means including a part carried by said spindle and actuated by said axial movement thereof for resisting increases of speed in the latter.

In testimony whereof I have hereunto signed my name to this specification.

THOMAS J. MURPHY.